United States Patent
Pille-Wolf

(10) Patent No.: US 10,472,502 B2
(45) Date of Patent: Nov. 12, 2019

(54) RESIN-EXTENDED RUBBER COMPOSITION AND TIRE RUBBER COMPOSITIONS PREPARED THEREWITH

(71) Applicant: Arizona Chemical Company, LLC, Jacksonville, FL (US)

(72) Inventor: Wolfgang Pille-Wolf, Tervuren (NL)

(73) Assignee: Kraton Polymers U.S. LLC, Houston, TX (US)

( * ) Notice: Subject to any disclaimer, the term of this patent is extended or adjusted under 35 U.S.C. 154(b) by 246 days.

(21) Appl. No.: 15/396,270

(22) Filed: Dec. 30, 2016

(65) Prior Publication Data

US 2017/0190888 A1    Jul. 6, 2017

Related U.S. Application Data

(60) Provisional application No. 62/273,680, filed on Dec. 31, 2015.

(51) Int. Cl.

| | |
|---|---|
| *C08L 9/06* | (2006.01) |
| *B29B 7/00* | (2006.01) |
| *B29B 7/74* | (2006.01) |
| *B29D 30/06* | (2006.01) |
| *B60C 1/00* | (2006.01) |
| *C08J 3/00* | (2006.01) |
| *C08J 3/215* | (2006.01) |
| *C08K 3/36* | (2006.01) |
| *C08L 25/10* | (2006.01) |
| *B29B 9/12* | (2006.01) |
| *B29K 9/06* | (2006.01) |

(52) U.S. Cl.
CPC ............... *C08L 9/06* (2013.01); *B29B 7/002* (2013.01); *B29B 7/7495* (2013.01); *B29D 30/0601* (2013.01); *B60C 1/00* (2013.01); *C08J 3/005* (2013.01); *C08J 3/215* (2013.01); *C08K 3/36* (2013.01); *C08L 25/10* (2013.01); *B29B 9/12* (2013.01); *B29K 2009/06* (2013.01); *C08J 2309/06* (2013.01); *C08J 2493/04* (2013.01); *C08L 2205/06* (2013.01)

(58) Field of Classification Search
CPC ........ C08L 9/06; C08L 2205/06; C08L 25/10; B29B 7/005; B29B 7/7495; B29B 9/12; B29D 30/0601; B29K 2009/06; B60C 1/00; C08J 3/005; C08J 3/215; C08J 2309/06; C08J 2493/04
USPC .................................................... 264/331.13
See application file for complete search history.

(56) References Cited

U.S. PATENT DOCUMENTS

| | | |
|---|---|---|
| 3,342,238 A | 9/1967 | Weinstock |
| 3,514,423 A | 5/1970 | Reinbold |
| 3,959,238 A | 5/1976 | Hokama et al. |
| 4,057,682 A | 11/1977 | Ruckel et al. |
| 4,113,653 A | 9/1978 | Ruckel et al. |
| 4,258,770 A | 3/1981 | Davis |
| 4,324,710 A | 4/1982 | Davis et al. |
| 4,419,470 A | 12/1983 | Davis et al. |
| 4,421,891 A | 12/1983 | Miyake |
| 4,478,993 A | 10/1984 | Wideman et al. |
| 4,491,655 A | 1/1985 | Sandstrom |
| 4,515,713 A | 5/1985 | Wideman et al. |
| 4,639,492 A * | 1/1987 | Makhlouf ............. C08G 8/34 525/54.42 |
| 5,504,135 A | 4/1996 | Ardrizzi et al. |
| 5,723,556 A | 3/1998 | Salvetat et al. |
| 5,844,063 A | 12/1998 | Salvetat et al. |
| 5,901,766 A | 5/1999 | Sandstrom |
| 6,057,392 A | 5/2000 | Wideman et al. |
| 6,103,808 A | 8/2000 | Hashimoto |
| 6,121,392 A | 9/2000 | Thompson |
| 6,228,944 B1 | 5/2001 | Blok et al. |
| 6,239,203 B1 | 5/2001 | Sandstrom et al. |
| 6,242,523 B1 | 6/2001 | Blok |
| 6,357,499 B1 | 3/2002 | Kralevich, Jr. et al. |
| 6,399,697 B1 | 6/2002 | Takasaki et al. |
| 6,825,262 B2 | 11/2004 | Gorl et al. |
| 7,294,664 B2 | 11/2007 | Jones |
| 7,659,337 B2 | 2/2010 | Jones |
| 7,759,412 B2 | 7/2010 | Okamatsu |
| 7,834,074 B2 | 11/2010 | Brunelet et al. |
| 7,897,665 B2 | 3/2011 | Kameda |
| 8,138,260 B2 | 3/2012 | Nakakita |
| 8,143,338 B1 | 3/2012 | Pompei |

(Continued)

FOREIGN PATENT DOCUMENTS

| | | | | |
|---|---|---|---|---|
| EP | 0623657 A2 * | 11/1994 | ............. | C09D 11/34 |
| EP | 775719 A2 | 5/1997 | | |

(Continued)

OTHER PUBLICATIONS

Textron—Sunflower Oil, High Oleic—https://www.brenntag.com/media/documents/bsi/product_data_sheet/life_science/textron_natural_oils/sunflower_oil_high_oleic_tx008082_pds.pdf (Year: 2011).*

*Primary Examiner* — Ling Siu Choi
*Assistant Examiner* — Ronald Grinsted

(57) ABSTRACT

A process for the preparation of a shaped rubber composition comprising combining a rubber compound with an extender compound to produce a mixture; drying the mixture to produce a dried mixture; and shaping the mixture wherein the extender compound comprises a natural or hydrocarbon resin, which possesses a glass transition temperature of at equal to or greater than about −70° C. and an acid value of 50 mg KOH/g or less and wherein the mixture is shaped into particles or bales.

18 Claims, No Drawings

(56) References Cited

U.S. PATENT DOCUMENTS

| | | |
|---|---|---|
| 8,178,605 B2 | 5/2012 | Lopitaux |
| 8,318,861 B2 | 11/2012 | Houjo |
| 8,349,956 B2 | 1/2013 | Lopitaux |
| 8,499,805 B2 | 8/2013 | Maesaka |
| 8,614,276 B2 | 12/2013 | Voge |
| 8,637,597 B2 | 1/2014 | Lopitaux |
| 8,637,606 B2 | 1/2014 | Pille-Wolf |
| 8,697,793 B2 | 4/2014 | Goto |
| 8,759,438 B2 | 6/2014 | Lopez |
| 8,779,026 B2 | 7/2014 | Lopitaux |
| 8,846,792 B2 | 9/2014 | Keung |
| 8,859,650 B2 | 10/2014 | Katou |
| 8,993,664 B2 | 3/2015 | Miyazaki |
| 9,040,613 B2 | 5/2015 | Lopitaux |
| 9,126,457 B2 | 9/2015 | Kaes |
| 9,132,699 B2 | 9/2015 | Lopitaux |
| 9,175,154 B2 | 11/2015 | Lopez |
| 2001/0023307 A1 | 9/2001 | Kaimai et al. |
| 2002/0045697 A1 | 4/2002 | Sohnen et al. |
| 2004/0092648 A1 | 5/2004 | Jones |
| 2004/0106735 A1 | 6/2004 | Tsou |
| 2005/0145312 A1 | 7/2005 | Herberger, Sr. et al. |
| 2005/0197442 A1 | 9/2005 | Jones |
| 2006/0167160 A1 | 7/2006 | Nakagawa |
| 2007/0134497 A1* | 6/2007 | Crafton .................. C08L 23/16 428/411.1 |
| 2008/0021149 A1 | 1/2008 | Jones |
| 2009/0326109 A1 | 12/2009 | Kameda |
| 2010/0099796 A1 | 4/2010 | Lopitaux |
| 2010/0113703 A1 | 5/2010 | Houjo |
| 2010/0179275 A1 | 7/2010 | Nakakita |
| 2010/0204358 A1 | 8/2010 | Lopitaux |
| 2010/0224301 A1 | 9/2010 | Sakamoto |
| 2010/0256275 A1 | 10/2010 | Lopitaux |
| 2010/0317800 A1 | 12/2010 | Pille-Wolf |
| 2011/0011511 A1 | 1/2011 | Miyazaki |
| 2011/0040002 A1 | 2/2011 | Lopitaux |
| 2011/0048599 A1 | 3/2011 | Ryba |
| 2011/0184084 A1 | 7/2011 | Katou |
| 2011/0190416 A1 | 8/2011 | Maesaka |
| 2011/0198010 A1 | 8/2011 | Voge |
| 2011/0226395 A1 | 9/2011 | Goto |
| 2012/0065292 A1 | 3/2012 | Lopitaux |
| 2012/0123018 A1 | 5/2012 | Kanz |
| 2012/0128994 A1 | 5/2012 | Majumdar et al. |
| 2012/0214933 A1 | 8/2012 | Lopez |
| 2012/0309865 A1 | 12/2012 | Lopez |
| 2013/0158172 A1 | 6/2013 | Lopez |
| 2013/0196085 A1 | 8/2013 | Voge |
| 2013/0202829 A1 | 8/2013 | Voge |
| 2013/0203889 A1 | 8/2013 | Lopitaux |
| 2013/0203890 A1* | 8/2013 | Lopitaux ............... B60C 1/0016 523/156 |
| 2013/0267640 A1 | 10/2013 | Lopez |
| 2013/0274404 A1 | 10/2013 | Vasseur |
| 2013/0296471 A1 | 11/2013 | Lesage |
| 2013/0345336 A1 | 12/2013 | Lopitaux |
| 2014/0024745 A1 | 1/2014 | Vasseur |
| 2014/0138004 A1 | 5/2014 | Voge |
| 2014/0155519 A1 | 6/2014 | Ringot |
| 2014/0171557 A1 | 6/2014 | Ringot |
| 2014/0235751 A1 | 8/2014 | Lesage |
| 2014/0243448 A1 | 8/2014 | Lesage |
| 2015/0119492 A1 | 4/2015 | Vasseur, Jr. |
| 2015/0284548 A1 | 10/2015 | Riou |
| 2016/0272796 A1 | 9/2016 | Washizu |

FOREIGN PATENT DOCUMENTS

| | | |
|---|---|---|
| EP | 902054 A1 | 3/1999 |
| EP | 1090069 B1 | 7/2004 |
| EP | 1900548 A1 | 3/2008 |
| EP | 2094510 B1 | 10/2010 |
| EP | 2460670 A1 | 6/2012 |
| EP | 2162298 B1 | 1/2013 |
| EP | 2172349 B1 | 3/2013 |
| EP | 2447316 B1 | 10/2013 |
| EP | 2865712 A1 | 4/2015 |
| EP | 2940072 A1 | 11/2015 |
| EP | 2960286 A1 | 12/2015 |
| EP | 2960287 A1 | 12/2015 |
| EP | 2960288 A1 | 12/2015 |
| EP | 2960289 A1 | 12/2015 |
| EP | 3059099 A1 | 8/2016 |
| EP | 3070120 A1 | 9/2016 |
| EP | 3063018 B1 | 8/2017 |
| JP | 11-256002 | 9/1999 |
| JP | 3964022 | 6/2007 |
| WO | 02/10277 A1 | 2/2002 |
| WO | 2004/000931 A1 | 12/2003 |
| WO | 2010/144890 A2 | 12/2010 |
| WO | 2011/130525 A1 | 10/2011 |
| WO | 2012/050657 A1 | 4/2012 |
| WO | 2014/178881 A1 | 11/2014 |
| WO | 2015/077800 A1 | 5/2015 |
| WO | 2015/124679 A1 | 8/2015 |

* cited by examiner

RESIN-EXTENDED RUBBER COMPOSITION AND TIRE RUBBER COMPOSITIONS PREPARED THEREWITH

CROSS-REFERENCE TO RELATED APPLICATIONS

This application claims priority from U.S. Provisional Application No. 62/273,680 filed on Dec. 31, 2015, the entire disclosure of which is incorporated herein by reference for all purposes.

FIELD

The present disclosure is in the field of rubber compositions for tire components, tire rubber compositions, and more specifically for tire tread compositions and tires prepared using the compositions according to the present disclosure.

BACKGROUND

Rubber compositions for tire components are generally prepared in several stages. The first step is generally production of uncured rubber composition. In a rubber manufacturing plant elastomers are processed to form uncured rubber. The rubber compositions used presently in the tire industry have relatively high molecular weights and thus are highly viscous. In order to be able to handle the rubber, processing oil is added to the rubber during the work up in the rubber manufacturing plant. Said processing oil lowers the viscosity so that the compositions are more readily processable in conventional rubber processing equipment such as internal rubber mixers, open roll mixing, extrusion and calendar processing which can occur at rubber compound formulators or tire manufacturers. Said oil-extended rubber composition is dried and shaped either into particles, granules, flakes, blocks etc. for shipment to the tire manufacturer.

The second step generally includes compounding by the tire manufacturer. The oil-extended rubber composition is transported to the tire manufacturing company. The tire company combines the rubber composition with additives such as fillers, curing aids such as sulfur, activators, retarders and accelerators, processing additives such as oils, resins (e.g., tackifying resins), silicas and plasticizers, pigments, processing aids, plasticizers and reinforcing materials such as carbon black and blends the various components to prepare a compounded rubber composition: a tire rubber composition such as a rubber tread composition, an inner liner composition etc. The last step generally involves building the tire by tire manufacturer. A tire is subsequently built with the various tire rubber compositions, shaped, molded, and finally the tire is cured to obtain a tire.

As mentioned-above, rubber formulations used in various tire components previously have been designed using conventional processing oils to soften and extend the rubber. Typically, aromatic processing oils, having a certain content of polycyclic aromatic (PCA) compounds or polyaromatic hydrocarbons (PAH), have been used. See for instance U.S. Pat. No. 6,103,808 which discloses a high aromatic oil and rubber composition and oil extended synthetic rubber using the same.

In addition to its use as extender oil during rubber processing, these oils may be used in the tire industry as processing aids to ease compounding of the rubber and as plasticizers to modify the mechanical properties of the rubber compound after vulcanization. These oils may also be used to influence the visco-elastic properties of a tire compound. The aromatic content of the extender oil may enhance wet grip properties. The nature of the oils used in extending synthetic rubber and processing rubber compounds can be the same.

Mineral oils are classified by their type: Aromatic, Naphthenic and Paraffinic. Most commonly used are distillate aromatic extract (DAE) oils that are processing oils with a high polycyclic aromatic hydrocarbon (PAH) content. These DAE oils are considered to have a negative impact on the environment and human health because of the PAH content. Recently, regulatory, environmental and social concerns have necessitated the use of processing oils having a lower PAH content. As a result, there is a desire for the rubber and tire industry to cease the use of process oils that contain more than 3% DMSO Extract as determined by the test method IP346 of the Energy Institute, London. It has been estimated that the tire industry will face major challenges, as switching from DAE will require about a million metric tons of DAE to be replaced per year.

For instance U.S. Pat. No. 5,504,135 discloses an oil composition which has a kinematic viscosity at 100° C. of from 32 to 50 cSt and which contains less than 3 weight percent polynuclear aromatic compounds that is employed as a process oil for rubber compounds, especially aromatic rubbers.

US 2001/0023307 discloses a rubber process oil in which the content of polycyclic aromatics (PCAs) as determined by the IP 346 method is less than 3% by mass and which is rich in aromatic hydrocarbons, and a method for producing the same.

US 2002/0045697 which discloses a sulfur-vulcanizable rubber composition which does not contain aromatic process oils including at least one diene elastomer, at least finely dispersed, precipitated silica and carbon as fillers, softeners, at least one silane coupling agent, and additional common additives as well as a process for their production.

U.S. Pat. No. 6,399,697 which discloses a process oil which satisfies requirements that a content of a polycyclic aromatic compound is less than 3% by weight, a content of an aromatic hydrocarbon is 18% by weight or more, a content of a polar compound is between 11 and 25% by weight, a kinematic viscosity at 100° C. is between 10 and 70 mm2/s, and a flash point is 210° C. or more.

US 2005/0145312 is directed to rubber compositions for tire components. In said rubber, part of the extending oil has been replaced with soybean oil and part of the carbon black usually present in the rubber, has been replaced with a starch/plasticizer composite.

In U.S. Pat. No. 4,478,993 the use of decarboxylated rosins is disclosed for as a total or partial replacement for oil in rubber formulations.

In U.S. Pat. No. 4,515,713 decarboxylated rosin acid is disclosed that can be used as extender oil for polymers, more particularly for tire tread formulations.

WO 2002/10277 describes a butyl elastomer for use as pneumatic tire inner liners. A styrene resin is added to the butyl polymer composition to improve the green strength and the cold flow properties. Optionally up to 7 phr extender oils are added to the composition so as not to impair the air non-permeability. In the examples the extender oil has been replaced with the styrene polymer.

To replace the use of these extender oils during rubber processing the tire industry has started to use Treated Distillate Aromatic Extract (TDAE) and Mild Extract Solvate (MES) oils. Both of these oils provide tires that have better rolling resistance but, unfortunately, worse wet grip properties. Residual Aromatic Extract (RAE) oils are offered as another possible replacement, and these oils provide better wet grip properties than the other oils with at least as good rolling resistance properties.

However, in changing to the use of the lower PAH content oils some loss in rubber compound performance has been noted. In order to provide such low PAH content oils, it is therefore necessary to develop new rubber compounds that provide desirable performance levels while incorporating the use of low PAH oils.

The most commercially desirable replacement oils that meet this specification will generally provide tires with lower wet grip. Most of the new oils are still based on non-renewable mineral oils.

In order to lower the amount of non-renewable mineral oils in the final rubber composition, several other compounds were proposed to replace the processing oils that are used as processing aid in rubber compositions.

Another development in the tire rubber industry is the tendency to increase the amount of additives during compounding to compensate for the impairment of the physical properties as a result of the reduction of processing oil present or as a replacement of the processing oil. For instance the amount of Tread Enhancing Additives (TEA) during compounding is increased so as to improve the physical properties of the resulting tires such as the wet traction and rolling resistance. However, since conventional rubber compositions usually contain a certain amount of extender oils, for instance usually 37.5 phr in styrene butadiene rubber, the maximum amount of TEA that can be added to the rubber composition is restricted. Generally speaking, to an oil-extended rubber composition at most 20 phr TEA can be added during compounding.

In WO 2010/144890 tire tread compositions are disclosed wherein additives comprising unsaturated aliphatic, cycloaliphatic and bicyclo-aliphatic hydrocarbons, and/or olefinically unsaturated non-acidic terpene compounds, vinyl aromatic hydrocarbons and phenolic compounds are included as tread enhancing additives to a blend of oil-extended containing styrene butadiene rubber and natural rubber.

In U.S. Pat. No. 4,324,710 a high melting aliphatic hydrocarbon-insoluble resin was added to a natural rubber masterbatch together with other processing oils during compounding to form a conventional tread ply skim.

In U.S. Pat. No. 4,419,470 a low softening thermoplastic resin with low acid number was added to rubber stocks. The resin is used to replace processing oils and petroleum-derived resins normally used in rubber stocks for tire manufacture. The resin is added after the final carbon black addition, i.e. during compounding. In the examples, to a conventional natural rubber/SBR-oil extended (extended with 15 phr naphtenic process oil) rubber blend additives are compounded. One of the additives is naphtenic process oil. Half of the naphtenic process oil that is added as additive is replaced with the resin.

In U.S. Pat. No. 6,239,203 a method is disclosed to improve the abrasion resistance of a cured rubber for a tire tread compound by dispersing up to 30 phrC12-C39 alcohol and sulphur in a dry isolated sulfur-vulcanizable rubber during compounding and curing the rubber. The alcohol is used to replace the processing oil.

In U.S. Pat. No. 6,057,392 a rubber composition is described wherein 0.5 to 50 phr of a fatty acid ester is added to replace the processing oil. In the examples an oil-extended (with 37.5 phr aromatic oil) styrene/butadiene copolymer elastomer, and polyisoprene is used. The processing oil that is used during compounding is replaced with the fatty acid ester.

WO 2012/050657 describes elastomeric compositions for, for instance, tire treads and side walls. A hydrocarbon polymer modifier is added during compounding in addition to, or as a replacement for other processing aids and oils. The hydrocarbon polymer modifier is an interpolymer of at least one piperylene component, at least one cyclic pentadiene component and at least one aromatic component. It has a softening point from 80 to 160° C. a molecular weight (Mz) larger than 10.000 an at least 1 mole % aromatic hydrogen. The hydrocarbon polymer modifier is added both to oil-extended rubber and non-oil extended rubber.

In WO 2011/130525 rubber compositions are described comprising processing oil wherein the processing oil comprises tall oil pitch. It is stated that the tall oil pitch may both replace the oil present as extender in the rubber composition and as processing oil during compounding.

In WO 2015/124679 a rubber composition is disclosed wherein during compounding a combination of plasticizers is added in the form of plasticizing oil and hydrocarbon resin.

Furthermore, promising candidate TEAs often have physical properties that require the use of even more additives to make them processable. For instance promising TEAs pose dusting problems or are susceptive to remassing or sintering. In order to avoid these processing issues, additives must be used so that the maximal total amount of TEA is further lowered. There is a demand in the industry to increase the amount and type of TEA that can be present in tire rubber compositions.

SUMMARY

Disclosed herein is a process for the preparation of a shaped rubber composition comprising combining a rubber compound with an extender compound to produce a mixture; drying the mixture to produce a dried mixture; and shaping the mixture wherein the extender compound comprises a natural or hydrocarbon resin, which possesses a glass transition temperature of equal from about −70° C. to about +120° C. and an acid value of 50 mg KOH/g or less and wherein the mixture is shaped into particles or bales.

Also disclosed herein is a process for the preparation of a tire rubber composition comprising compounding a rubber compound and an extender compound wherein the extender compound comprises a natural or hydrocarbon resin, which possesses a glass transition temperature of equal to or greater than about −10° C. and an acid value of 50 mg KOH/g or less resin concentration wherein the extender compound is present in an amount of greater than about 10 phr.

Also disclosed herein is a process for the production of a tire comprising preparing a shaped rubber composition comprising combining a rubber compound with an extender compound to produce a mixture wherein the extender compound comprises a natural or hydrocarbon resin, which possesses a glass transition temperature of equal to or greater than about −10° C. and an acid value of 50 mg KOH/g or less; drying the mixture to produce a dried mixture; b) shaping the mixture into particles, and c) moulding the particles into tire components and curing the moulded particles.

DETAILED DESCRIPTION

Some aspects described herein are related to use of a natural or hydrocarbon resin, which possesses a glass transition temperature of at least −10° C. and an acid value of 50 mg KOH/g or less (or a glass transition temperature (Tg) of 0° C. or less and a molecular weight of at least 300 Dalton (Mw)) as a sustainable alternative to mineral oil in rubber processing. Other aspects of the present disclosure relate to use of a natural or hydrocarbon resin wherein the natural or hydrocarbon resin has a molecular weight ranging from 400 to 2000 Dalton (Mw) and a transition glass temperature (Tg) of between −10 and 100° C., alternatively the natural hydrocarbon resin possesses a glass transition temperature of at least −10° C. and an acid value of 50 mg KOH/g or less (or a glass transition temperature (Tg) of 0° C. or less and a molecular weight of at least 300 Dalton (Mw)) to improve the performance characteristics of a tire rubber composition and a tire tread composition. Even other aspects of the present disclosure relate to use of blends of these resins and mineral oil to increase the sustainability factor of the tire.

Disclosed herein is a rubber composition comprising a diene rubber and an extender compound, the extender compound comprising a natural or hydrocarbon resin, which possesses a glass transition temperature of at least −10° C. and an acid value of 50 mg KOH/g or less (or a glass transition temperature (Tg) of 0° C. or less and a molecular weight of at least 300 Dalton (Mw)).

The natural or hydrocarbon resin, which possesses a glass transition temperature of at least −10° C. and an acid value of 50 mg KOH/g or less (or a glass transition temperature (Tg) of 0° C. or less and a molecular weight of at least 300 Dalton (Mw)) ensures the processability of the rubber during the production of the rubber composition. The natural or hydrocarbon resins of the type disclosed herein as opposed to mineral oils do not pose a threat to the environment, and thus provide a sustainable alternative to mineral oil in this application.

Non-limiting examples of these types of resins are aliphatic hydrocarbon resins, phenolic resins, coumarone-indene resins, C9 resins, C5 resins, aromatic resins such as alpha-methyl styrene resins, cyclo-aliphatic resins, terpene resins, oligo-ester resins, rosin and/or rosin esters.

Because of their excellent viscosity reducing qualities and physical properties improving effect in an aspect the resins comprise alpha-methyl styrene resins, terpene resins, oligoester resins, rosin and/or rosin esters. In an aspect resins suitable for use in the present disclosure can have a melt viscosity of from about 500 mPas to about 30000 mPas, alternatively from about 500 mPas to about 5000 mPas, alternatively from about 2000 mPas to about 30000 mPas, or alternatively from about 10000 mPas to about 50000 mPas when measured at about 100° C. above their Glass Transition Temperature in accordance with ASTM D1084.

In an aspect a process of the type disclosed herein affords the use of resins with high Tg (e.g., greater than about +100° C.) or high softening point (e.g., greater than about +155° C.) and thus mitigate difficulties associated with mixing during the compounding processes which occur at temperature maximums in the range of 150° C.-160° C. so as to prevent scorching of the materials due to the presence of additives such as reactive silanes.

Since the natural or hydrocarbon resin, which possesses a glass transition temperature of at least −10° C. and an acid value of 50 mg KOH/g or less (or a glass transition temperature (Tg) of 0° C. or less and a molecular weight of at least 300 Dalton (Mw)) is combined with the diene rubber, any problems concerning dusting problems or remassing or sintering that may be connected to a certain types of resins upon compounding is avoided. Furthermore, since the natural or hydrocarbon resin is added in lieu of the conventional processing oil-extender, the rubber composition may be loaded with extender compound to a very high amount, up to 75 phr. For example the natural or hydrocarbon resin may be present in an amount of from greater than about 20 phr, alternatively from about 10 phr to about 75 phr, alternatively from about 10 phr to about 50 phr, alternatively from about 10 to about 30 phr, alternatively from about 20 phr to about 75 phr, or the resin is very homogeneously distributed within the rubber composition, and after drying and shaping can be readily stored and/or transported to the compounder and processed into further rubber compositions such as tire rubber compositions and tire tread compositions. The present disclosure is therefore also directed to a particulate rubber composition comprising natural or hydrocarbon resin extended rubber, which resin possesses a glass transition temperature of at least −10° C. and an acid value of 50 mg KOH/g or less (or a glass transition temperature (Tg) of 0° C. or less and a molecular weight of at least 300 Dalton (Mw)).

Herein the term "particulate" is meant shaped into particles that render storage, transport and further processing by compounding possible. In general this means that the rubber composition is comminuted into small particles, granules, bales, flakes, shaped into blocks, or any other suitable shape for storage, transport and further processing by compounding.

The resin used in the present disclosure may be natural or synthetic in nature. Since the aim is to replace mineral oil, in an aspect the resin is of natural origin. In its broadest aspect the resin may have a Tg ranging from −70° C. to 170° C. and a molecular weight ranging from 200 Daltons to 4000 Daltons, alternatively the oligo-ester composition may include any resin that possesses a glass transition temperature of at least −10° C. and an acid value of 50 mg KOH/g or less, alternatively the resin has a molecular weight ranging from 400 to 2000 Dalton and a transition glass temperature (Tg) of between −10° C. and 100° C. When the resin has these properties the rubber compounds may be used of very high viscosity. In another aspect, a resin suitable for use in the present disclosure possesses Tg of 0° C. or less and a molecular weight of at least 300 Dalton (Mw), or it may possess a Tg of between −70° C. and 10° C. (or −60° C. and 0° C., −55° C. and −5° C., or −50° C. and −10° C.) and a molecular weight ranging from 300 to 3000 Dalton (or 300 to 2500 Dalton, or 325 to 2000 Dalton, or 350 to 2000 Dalton). In an aspect the resin may a Tg ranging from −70° C. to 120° C. In some aspects either singularly or in combination with any of the aforementioned Tg the resin may have a molecular weight ranging from 500 Daltons to 4000 Daltons, alternatively from 800 Daltons to 4000 Daltons, or alternatively from 300 Daltons to 3000 Daltons.

In the present disclosure the resin acts as an extender for the rubber. The rubber composition may include 1, 5, 10, 15, 20, 25, 30, 35, 40, 45, 50, 55, 60, 65, 70, 75 parts of resin as extender (based on 100 parts of rubber compound), or in any range from to or between any two of the foregoing numbers. For example, the rubber composition could contain from 1 to 75 parts per hundred of resin, 25 to 75 parts per hundred of resin, or 50 to 75 parts per hundred of resins.

When relatively high resin loadings are used, the rubber composition can suitably be used as masterbatch for compounding in combination with other additives to form a tire rubber composition. For instance, rubber compositions with a resin concentration of more than 20 phr, alternatively more than 30 phr are suitable. But also rubber compositions containing from 50 to 75 phr can suitably be used as masterbatch.

If resin loadings of more than 20 phr are used, alternatively 30 to 50 phr, the rubber composition may be optimally used for rubber tire compositions and/or tire tread compositions by compounding this rubber composition with suitable other additives. Since the resin loading takes place during the rubber processing and in lieu of at least part of the oil-extenders, the resin loading can be higher than possible with the prior art rubber tire compositions and tire tread compositions, where the resin was not added until compounding.

The addition of Tread Enhancing Additives (TEA) during compounding can be reduced or omitted altogether, because the resin (usually comprising suitable TEA's) has already been homogeneously distributed within the rubber composition during rubber processing.

For those aspects that utilize an extender processing oil mixture of resin in combination with other processing oils, the resin can comprise at least 1, 5, 10, 20, 30, 40, 50, 60, 70, 80, 90, 95 or 99 weight percent of the extender mixture, or any range from/to or between any two of the foregoing numbers.

Alternatively however, no other extender compounds are present in the rubber composition according to the present disclosure. In an aspect according to the present disclosure the mineral oil is fully replaced with terpene and/or rosin ester resin.

As mentioned above, the resin that is used as extender according to the present disclosure comprises aliphatic hydrocarbon resins, aromatic resins such as alpha-methyl styrene resins, cyclo-aliphatic resins, terpene resins, oligoester resins, rosin and/or rosin esters.

Aliphatic hydrocarbon resins are known tire rubber additives and are commercially available. Any that fulfills the glass transition temperature requirements and acid number requirement can suitably be used in the present disclosure. Non-limiting examples of suitable commercially available aliphatic hydrocarbon resins are the C5 piperylene-containing resins. The liquid C5 feedstock can be polymerized to a hard resin using a Lewis acid catalyst and selecting temperature and pressure to obtain the desired Tg and molecular weight. C5 resins are in essence aliphatic materials. They are available in a wide range of softening points and molecular weights. Examples are QUINTONE® A100 of Zeon Chemical and ESCOREZ™ 1000, 2000 and 5000 series manufactured by Exxonmobile Chemical.

Aromatic resins such as alpha methyl styrene resins are commercially available tire rubber additives. They usually are C9 resin oils such as alpha-methylstyrene resins. These resins may comprise other styrenic monomers. Alternatively, the other styrenic monomer is selected from the group consisting of styrene, vinyl styrene, p-methylstyrene (vinyl toluene), p-chlorostyrene, p-methoxystyrene, indene, indene derivatives and mixtures thereof. In an aspect the styrenic monomer may be selected from the group consisting of styrene, p-methylstyrene and mixtures thereof.

A resin of alpha-methylstyrene and styrene useful in the present disclosure is commercially available from Eastman Corp. under the tradename KRISTALEX® F85. A resin of alpha-methylstyrene and vinyl toluene useful in the present is commercially available from Eastman Corp. under the tradename PICCOTEX® LC. Any alpha methyl styrene resin that fulfills the glass transition temperature requirements and acid number requirement can suitably be used in the present disclosure. Other nonlimiting examples of suitable commercially available alpha methyl styrene resins are NORSOLENE® W-85 of Cray Valley (or Total) and SYLVATRAXX™ 4401 or SYLVATRAXX™ 4412 from Arizona Chemical Company.

Aliphatic (and cyclo-aliphatic) resins include organic compounds whose carbon atoms are linked in open chains, either straight or branched or cyclic, rather than containing a benzene ring. They may be saturated or unsaturated and include alkanes, alkenes, and alkynes. Aliphatic resins are further defined in Mildenberg, Rolf et al. (2008). Hydrocarbon Resins. New York, N.Y.: VCH Publishers, the entire subject matter of which is incorporated herein by reference.

The terpene resin that may be used as extender according to the presemt disclosure comprises terpenes such as bicyclic terpenes and monocyclic terpenes, such as δ-2-carene, δ-3-carene, dipentene, limonene, myrcene, β-phellandrene, α-pinene, β-pinene, α-terpinene, γ-terpinene, and terpinolene.

The terpene resin may be, e.g., an oligoterpene resin (i.e., a resin prepared from terpene as the sole hydrocarbon monomer), a terpene hydrocarbon resin (i.e., a resin prepared from terpene as well as non-terpene hydrocarbon monomer(s)), and/or a terpene phenolic resin (i.e., a resin prepared from terpene and phenolic compound), where collectively these resins are referred to herein as "terpene resins". In one aspect, the resin is a terpene hydrocarbon resin, e.g., a terpene vinylaromatic resin. In another aspect the resin is a terpene phenolic resin. In yet another aspect the resin is a oligoterpene resin. The terpene resin may also be a mixture of any of the above-described terpene resins.

In one aspect, the terpene resin is prepared, at least in part, from α-pinene. In another aspect the selected terpene resin is prepared, at least in part, from β-pinene. In another aspect, the selected terpene resin is prepared, at least in part, from limonene. In another aspect, the selected terpene resin is prepared, at least in part, from a carene. In another aspect, the selected terpene resin is prepared, at least in part, from dipentene. Each of these terpenes may be obtained from various commercial suppliers, e.g., Aldrich Chemical (Milwaukee, Wis.), Arizona Chemical Company (Jacksonville, Fla.), Millennium Specialty Chemicals (Jacksonville, Fla.), International Flavors and Fragrances (formerly Bush Boake Allen in Jacksonville, Fla.), or DRT (Les Derives Resiniques et Terpeniques of Dax, France) or by transformations such as the isomerization of α-pinene to dipentene or of δ-3-carene to δ-2-carene or the isomerization of β-pinene to myrcene. α-Pinene, β-pinene, δ-3-carene and dipentene are often ultimately obtained from trees, particularly pine trees. Limonene can be obtained from the citrus processing industry.

In one aspect, the resin is the cationic polymerization product of a terpene, e.g., it may be prepared by cationic polymerization of resin-grade β-terpene, monomer, limonene monomer, or a mixture of the two monomers. Cationic polymerization of terpenes may be achieved by treating the terpene with a Lewis acid catalyst. More specifically, catalysts that may be used include aluminum chloride (AlCl3) and boron trifluoride (BF3) and their derivatives (e.g., their etherates or other solvated form); as well as acidic clays, antimony halides, strong protic acids such as hydrofluoric acid and sulfuric acid, and titanium tetrachloride. The catalysts may be removed from the resin by any number of suitable processes. The terpene resins, so produced, may be further subjected to treatment at elevated temperature to distill away solvent and remove co-products, and thereby achieve a desired softening point for the resin.

In one aspect, the resin is the cationic polymerization product of a terpene, e.g., it may be prepared by cationic polymerization of resin-grade β-terpene, monomer, limonene monomer, or a mixture of the two monomers. Cationic polymerization of terpenes may be achieved by treating the terpene with a Lewis acid catalyst. More specifically, catalysts that may be used include aluminum chloride (AlCl3) and boron trifluoride (BF3) and their derivatives (e.g., their etherates or other solvated form); as well as acidic clays, antimony halides, strong protic acids such as hydrofluoric acid and sulfuric acid, and titanium tetrachloride. The catalysts may be removed from the resin by any number of suitable processes. The terpene resins, so produced, may be further subjected to treatment at elevated temperature to distill away solvent and remove co-products, and thereby achieve a desired softening point for the resin.

In an aspect β-pinene is used to prepare the terpene resin. β-pinene monomer is commonly obtained by distillation of crude sulfate turpentine, which is a by-product of the paper industry. Resin-grade β-pinene is generally about 80% by weight β-pinene with much of the remainder being α-pinene. Higher purity grades of β-pinene, such as the so-called aroma-chemical grade thereof, which is greater than 90% by weight β-pinene, may also be used in preparing the terpene resins. See, e.g., U.S. Pat. No. 4,487,901 for disclosure directed to making β-pinene resin. The resin may also be prepared from α-pinene (see, e.g., U.S. Pat. Nos. 4,113,653 and 4,057,682, incorporated by reference herein).

In another aspect the terpenes used to prepare the terpene resin are limonene and dipentene. Limonene may be obtained as a byproduct of the citrus industry. Dipentene obtained as a fraction from refining Crude Sulfate Terpentine CST or by catalytic isomerization of α-pinene (i.e., racemic limonene) may also be used in preparing the terpene resins.

The terpene resin may comprise, in addition to the residues from the above terpenes, the residues of various non-terpenic unsaturated compounds, particularly unsaturated hydrocarbons, e.g., olefins and dienes. Examples thereof include, but are not limited to: isobutylene, diisobutylene, 1-alkenes (e.g., 1-octadecene), 2-alkenes, trisubstituted alkenes, vinylcyclohexene, as well as piperylene and dicyclopentadiene streams obtained from steam cracking of petroleum distillates. The latter streams generally include piperylene, isoprene, 2-methyl-2-butene, 2-methyl-1-butene, cyclopentene, an acyclic pentene, cyclopentadiene, and dicyclopentadiene. See, e.g., U.S. Pat. Nos. 6,121,392 and 3,959,238 for disclosure directed to resins made from β-pinene and various unsaturated hydrocarbons, incorporated by reference herein.

An exemplary terpene-hydrocarbon resin contains from 65 to 35 percent by weight of polymeric units derived from dicyclopentadiene and from 35 to 65 percent by weight of polymeric units derived from β-pinene. In one aspect, the molar ratio of the dicyclopentadiene to beta-pinene in the polymerization reaction starting materials ranges from about 1:2 to about 2:1. The polymerization reaction between dicyclopentadiene and β-pinene may be a thermal (i.e. no catalyst is employed) or catalyzed (i.e., conducted in the presence of a catalyst, e.g., an acid catalyst). Examples of acid catalysts that may be used include Brønsted acid and Lewis acid-type catalysts, such as H2SO4, HCl, H3PO4; metal halides such as BF3, BCl3, AlCl3, AlBr3, SnCl4, ZnCl2, SbCl3 as well as the etherates thereof. In the catalyzed polymerization process, the amount of catalyst may range from about 0.1 to about 20 weight percent of catalyst based on the total weight of reactants to be polymerized. The polymerization reaction may be carried out neat (without solvent) at or above the melting points of the reactants, or can be carried out in the presence of a solvent. The reaction pressure may vary and range from about one atmosphere to about 100 atmospheres with a pressure of from about two atmospheres to about ten atmospheres being preferred. The reaction temperature may range from about 0-100° C. A reaction time of about 1-8 hours is generally sufficient to achieve a desired molecular weight distribution of from about 550 to about 55,000 (weight average molecular weight), and a softening point ranging from about 100 to about 170° C. Other limonene-containing hydrocarbon resins include those described in U.S. Pat. Nos. 6,357,499 and 6,228,944, incorporated by reference herein.

Terpene-phenol resins that may be used for the above-disclosed process of the present disclosure ("the terpene-phenol resins") may be prepared by acid catalyzed polymerization, in a suitable solvent, of any of the above-mentioned terpenes with phenol and/or a derivative thereof. This is described in more detail, in U.S. Pat. Nos. 5,723,566 and 5,844,063, incorporated by reference herein. Lewis acids, including but not limited to boron trifluoride and derivatives or complexes thereof, and strong protic acids such as those listed above, may be used. The phenolic portion of the terpene phenol resin may be, e.g., phenol itself, or substituted phenols.

Non-terpene olefins and dienes that may be used in addition to the terpenes for preparing the terpene-phenol resins, include those listed above for the terpene resins. For instance, residues of the following non-terpene olefins and diolefins may be present in the terpene-phenolic resin: vinylaromatics such as styrene, indene, α-methylstyrene, divinylbenzene, a divinylbenzene with one or more alkyl groups, isobutylene, diisobutylene, a 1-alkene, a 2-alkene, a trisubstituted alkene, vinylcyclohexane, vinylcylcohexene, piperylene, isoprene, 2-methyl-2-butene, 2-methyl-1-butene, cyclopentene, an acyclic pentene, cyclopentadiene, dicyclopentadiene, and alkylaromatic styrenes.

Some specific nonlimiting examples of terpene-phenol resins, suitable for use in the above-disclosed process of the present disclosure, are commercial products designated as SYLVATRAXX™ 4201, SYLVATRAXX™ 4202, SYLVATRAXX™ 4401, SYLVATRAXX™ 6701 sold by Arizona Chemical Company (Jacksonville, Fla.). Other suitable examples are the polyterpenes of the SYLVAGUM™ TR series from Arizona Chemical Company, and the Styrenated Terpenes of the SYLVARES™ ZT and ZONATAC™ series from Arizona Chemical Company.

Some of the processes that may be used to prepare the above-described terpene, terpene-phenol, terpene-vinylaromatic and hydrocarbon resins, are described in the Kirk-Othmer Encyclopedia of Chemical Technology, Fourth Edition, Volume 13, pp. 717-743, John Wiley & Sons, New York, N.Y., incorporated by reference herein.

Rosin is a known tire rubber additive and is commercially available. Rosin is a solid resinous material that occurs naturally in pine trees. There are three major sources of rosin, (1) gum rosin is from the oleoresin extrudate of the living pine tree, (2) wood rosin from the oleoresin contained in the aged stumps; and (3) tall oil rosin from the waste carboxyl group to the liquor recovered as a by-product in the Kraft paper industry. Any rosin that fulfills the glass transition temperature requirements and acid number requirement can suitably be used in the present disclosure. Suitable commercially available rosin esters are SYLVALITE™ RE 100, SYLVALITE™ RE 95, SYLVALITE™ RE 85 from Arizona Chemical Company.

The rosin ester resin that can be used in the present disclosure may be an ester of rosin and a polyhydric phenol. The polyhydric alcohol can be selected from the group consisting of ethylene glycol, propylene glycol, diethylene glycol, triethylene glycol, tetraethylene glycol, trimethylene glycol, pentaerythritol, dipentaerythritol, tripentaerythritol, trimethylolethane, trimethylolpropane, mannitol, sorbitol, and mixtures thereof. Suitable rosin ester resins for use in the above-disclosed rubber composition are commercial products sold under the SYLVAGUM™ RE series, and SYLVALITE™ RE series from Arizona Chemical Company (Jacksonville, Fla.) and SYLVATRAXX™ series.

In another aspect, oligoester resins may also be used in the present disclosure as the resin extender. Provided herein oligoester compositions may be derived from one or more rosins; one or more monocarboxylic acids; one or more polyhydric alcohols; and optionally one or more polycarboxylic acids. In one aspect, the oligoester compositions can be derived from 5% to 85% by weight (e.g., from 30% to 75% by weight, or from 30% to 60% by weight) rosin, based on the total weight of the components used to form the oligoester composition. The rosin can be derived from tall oil rosin, gum rosin, wood rosin, or a combination thereof. In some aspects, the rosin can have a PAN number of less than 15 (e.g., less than 10, or less than 5), as determined according to the method described in ASTM D5974-00 (2010). In certain aspects, the rosin can be derived from tall oil rosin. In some aspects, the rosin can comprise at least 35% by weight dehydroabietic acid (e.g., from at least 45% by weight dehydroabietic acid), based on the total weight of the rosin. The oligoester compositions can be derived from at least 15% by weight (e.g., at least 20% by weight) one or more monocarboxylic acids. For example, in some aspects, the oligoester compositions can be derived from 15% to 90% by weight (e.g., from 25% to 85% by weight, from 35% to 85% by weight, or from 40% to 80% by weight) one or more monocarboxylic acids, based on the total weight of the components used to form the oligoester composition. In some aspects, the one or more monocarboxylic acids can comprise at least six carbon atoms (e.g., from 6-32 carbon atoms, from 6-25 carbon atoms, from 6-22 carbon atoms, from 6-18 carbon atoms, or from 6-12 carbon atoms). In some aspects, the one or more monocarboxylic acids can comprise a fatty acid (e.g., a hydrogenated fatty acid). In some aspects, the fatty acid can comprise a fatty acid derived from a vegetable oil or an animal oil. In certain aspects, the one or more monocarboxylic acids can be selected from the group consisting of oleic acid, linoleic acid, alpha-linolenic acid, palmitic acid, stearic acid, and combinations thereof. In certain aspects, the one or more monocarboxylic acids can comprise a tall oil fatty acid. In certain aspects, the one or more monocarboxylic acids can have an iodine number of less than 115 mg/g (e.g., less than 80 mg/g), as determined according to the method described in ASTM D5768-02 (2014).

Oligo-ester compositions of the type disclosed herein can be derived from 5% to 30% by weight (e.g., from 9% to 18% by weight) one or more polyhydric alcohols, based on the total weight of the components used to form the oligo-ester composition. In certain aspects, the oligo-ester composition can be derived from 9.7% to 12.7% by weight one or more polyhydric alcohols. The one or more polyhydric alcohols can have an average hydroxyl functionality of from two to ten (e.g., from two to six, or from two to five). In some cases, the one or more polyhydric alcohols comprise from 2 to 30 carbon atoms (e.g., from 2 to 16 carbon atoms). In some cases, the one or more polyhydric alcohols can have a boiling point greater than 240° C.

In some cases, the one or more polyhydric alcohols comprise an aliphatic alcohol (e.g., a cycloaliphatic alcohol). In some aspects, the one or more polyhydric alcohols can comprise a polyol that comprises a first hydroxyl group separated from a second hydroxyl group by at least three carbon atoms (e.g., at least six carbon atoms). In some aspects, the one or more polyhydric alcohols comprise a polyol that comprises each hydroxyl group of the polyol is separated from the other hydroxyl group of the polyol by at least three carbon atoms (e.g., at least six carbon atoms). In some aspects, the one or more polyhydric alcohols can be selected from the group consisting of ethylene glycol, propylene glycol, diethylene glycol, triethylene glycol, tetraethylene glycol, neopentylglycol, trimethylene glycol, glycerol, trimethylolpropane, trimethylolethane, pentaerythritol, pentaerythritol technical grade, dipentaerythritol, tripentaerythritol, 1,4-cyclohexanediol, polyglycerol, polyglycerol technical grade, polyglycerol-3, polyglycerol-4, cyclohexane-1,4-dimethanol, tricyclo[5.2.1.0(2.6)]decane-4,8-dimethanol, hydrogenated bisphenol A (4,4'-Isopropylidenedicyclohexanol), mannitol, sorbitol, xylitol, maltitol, lactitol, and combinations thereof. In certain cases, the one or more polyhydric alcohols can be chosen from diethylene glycol, triethylene glycol, glycerol, trimethylolpropane, pentaerythritol, pentaerythritol technical grade, dipentaerythritol, polyglycerol, polyglycerol-4, tricyclo [5.2.1.0(2.6)]decane-4,8-dimethanol, cyclohexane-1,4-dimethanol, hydrogenated bisphenol A (4,4'-Isopropylidenedicyclohexanol), and combinations thereof. In some aspects, the composition can be derived from greater than 0% to 4% by weight (e.g., than 0% to 3% by weight, or from greater than 0% to 1% by weight) one or more polycarboxylic acids, based on the total weight of the components used to form the oligoester composition. In certain aspects, the composition can be derived from greater than 0% to 4% by weight (e.g., than 0% to 3% by weight, or from greater than 0% to 1% by weight) one or more dicarboxylic acids, based on the total weight of the components used to form the oligoester composition. In other aspects, the composition can be derived from no polycarboxylic acids. In some cases, the one or more polycarboxylic acids can be chosen from adipic acid, 3-methyladipic acid, succinic acid, sebacic acid, 1,4-cyclohexanedicarboxylic acid, 1,3-cyclohexanedicarboxylic acid, 1,2-cyclohexanedicarboxylic acid, rosin dimer, isophthalic acid, terephthalic acid, phthalic acid, tall oil fatty acid dimer, hydrogenated tall oil fatty acid dimer, 2-(2-carboxyphenyl)benzoic acid, 2,5-furandicarboxylic acid, and combinations thereof.

The ratio of the weight of one or more polycarboxylic acids to the weight of the rosin and the one or more monocarboxylic acids can be less than 1:20 (e.g., less than 1:30, less than 1:50, or less than 1:100). The ratio of the weight of the rosin to the weight of the one or more monocarboxylic acids can range from 60:40 to 10:85. The ratio of the weight of the rosin and the one or more monocarboxylic acids to the weight of one or more polycarboxylic acids can be at least 6.5:1 (e.g., at least 9:1, at least 12:1, or at least 15:1). In certain cases, the oligoester composition can be derived from 30% to 75% by weight rosin, from 25% to 60% by weight one or more monocarboxylic acids, from 3% to 18% by weight one or more polyhydric alcohols; and from 0% to less than 4% by weight one or more polycarboxylic acids.

In some aspects, the oligo-ester composition can have a weight average molecular weight of at least 1,000 Da (e.g., a weight average molecular weight of from 1,000 Da to 5,000 Da). In some aspects, less than 35 percent by weight (e.g., less than 20 percent by weight, or less than 10 percent by weight) of the oligo-ester composition can have a molecular weight of less than 1,000 Da. The oligo-ester composition can have an acid value less than 12 mg KOH/gram (e.g., less than 6 mg KOH/gram). The oligo-ester composition can have a hydroxyl number of less than 12 mg KOH/gram (e.g., less than 6 mg KOH/gram, or less than 3 mg KOH/gram).

In the rubber composition according to the disclosure a combination of resins may be used.

The term "phr" means parts per hundred parts of rubber by weight, and is a measure common in the art wherein components of a composition are measured relative to the total of all the rubber (elastomer) components. The total phr or parts for all rubber components whether two, three or more different rubber components are present in a given recipe is always defined as 100 phr. Other non-rubber components are generally proportional to the 100 parts of rubber and may be expressed in phr. In other words the non-rubber components may be expressed relative to 100 parts rubber.

The resin may be used as an extender in the rubber composition, but also additional resin may be added during compounding. The resins used according to the present disclosure have been found to be excellent rubber enhancing additives or processing additives and since the mineral oil that conventionally is used as an extender is replaced fully or partly with resin, the maximum amount of extender is no longer restricted to maximally 20 phr and can be increased up to 75 phr. Resin may also be added during rubber compounding, for example in a mixer or mill, to enhance the final rubber composition properties or to enhance the processability.

While certain aspects utilize extender compound that is 100% resin, other aspects contemplate a mixture of resin with other known extenders such as processing oils. Suitable other known processing oils include various oils as are known in the art, including aromatic, paraffinic, naphthenic, vegetable oils (other than castor oil), and low polyaromatic hydrocarbon (PAH) oils, such as methylated seed (MES), treated distillate aromatic extract (TDAE), SRAE and heavy naphthenic oils. Suitable low PAH oils include those having a DMSO extract content according to IP346 of less than 3 percent by weight.

The rubber compositions will comprise a diene rubber. It should be understood that the rubber composition, may include any suitable diene rubber polymer or combinations of rubber polymers as the rubber. The type of rubber polymer selected as the diene rubber may include natural rubber and its various raw and reclaimed forms as well as various synthetic rubber polymers, and any combinations thereof, depending upon the desired end use.

Representative synthetic rubber polymers are the homopolymerization products of butadiene and its homologues and derivatives, for example, methylbutadiene, dimethylbutadiene and pentadiene, as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Specific examples of synthetic rubbers include neoprene (polychloroprene), polybutadiene (including cis-l, 4-polybutadiene), polyisoprene (including cis-l,4-polyisoprene), butyl rubber, halobutyl rubber such as chlorobutyl rubber or bromobutyl rubber, styrene/isoprene butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. Additional nonlimiting examples of rubbers which may be used include alkoxy-silyl end functionalized solution polymerized polymers (SBR, PBR, IBR and SIBR), silicon-coupled and tin-coupled star-branched polymers. It should be understood that any of the rubbers may be end-modified. Such an end-modifying group may be a carboxyl group, an amino group, a hydroxyl group, an alkoxyl group or a silanol group (—SiOH), for example. Meanwhile, a rubber may contain a modifying group inside the rubber chain. Such a modifying group may be an epoxy group or a ketone group, for example. Any of these rubbers can be used either in a single form or an arbitrarily blended form. Alternatively styrene/butadine copolymer blends are used, since these are often used in tire rubber compositions.

As mentioned-above, the rubber composition may suitably be used to prepare a tire rubber composition. The present disclosure is also directed to a tire rubber composition. In the tire rubber composition of the present disclosure the rubber composition has been compounded with any suitable additives and fillers as may be desired. Since the rubber composition according to the disclosure has been extended with resin, the distribution of these extenders is thought to be more homogeneous than rubber compositions wherein these compounds were not added until during compounding. Therefore a very stable tire rubber composition is obtained, which is less susceptible to remassing. Furthermore, since the resin has been added during rubber processing, a wider freedom of choice of resin is obtained. The equipment usually present in rubber processing plants is more adapted to handle dusting problems than the equipment present at compounders. Incorporation at the rubber processor makes it possible to incorporate resins that provide optimal properties to the rubber composition, but pose problems to the compounders with respect to processability.

It is possible to blend various additives generally used in tire rubber compositions, including, curing aids such as sulfur, activators, retarders and accelerators, processing additives such as oils resins, including tackifying resins, silicas and plasticizers, fillers, pigments, antioxidants coupling agents, viscosifiers, softeners, and reinforcing materials such as carbon black and the like to form the tire rubber composition of the present disclosure.

Such an additive can be kneaded with the rubber composition by a general method, thereby being used for a curing or crosslinking process. Blending amounts of these additives may be set to conventional and general blending amounts so far as the usages thereof do not contradict with the object of the present disclosure. The tire rubber composition of the present disclosure can be manufactured by mixing the above-mentioned components by using publicly-known rubber kneading machines including Banbury mixers, kneaders, and roll mills, for example.

The rubber composition according to the disclosure may further be compounded with tread enhancing additives (TEA) so as to form a tire tread composition. Any suitable tread enhancing additive may be added. The resins as described-above have been found to be excellent tread enhancing additives and thus the rubber composition according to the disclosure is an extremely suitable component for tire tread compositions. The disclosure is therefore also directed to tire tread compositions comprising the rubber composition according to the disclosure. As explained above, by using the resin-extended rubber composition according to the disclosure a tire treat compositions may be prepared with more than 20 phr of TEA in the form of resin. With conventional techniques this was not possible, at least not with all types of diene rubber that are generally used in the tire industry. The present disclosure is therefore also directed to a tire rubber composition comprising more than 20 phr TEA, preferably more than 30 phr. As mentioned above, since the resin is combined with the rubber compound, any problems concerning dusting problems or remassing or sintering that may be connected to a certain type of resin upon compounding is avoided. This increases the freedom of choice of the resin to be incorporated. The resin extended rubber containing tire tread composition is stable and the resin is very homogeneously distributed within the rubber composition.

The disclosure is further directed to a process for the preparation of a tire and tire that has been built using a tire tread composition according to the disclosure.

EXAMPLES

The present disclosure is further illustrated by means of the following examples. These Examples are to be taken as illustrative rather than as limiting the scope or nature of the claims below. Numerous modifications and variations will become apparent to those skilled in the art after studying the disclosure, including use of equivalent functional and/or structural substitutes for elements described herein, use of equivalent functional couplings for couplings described herein, and/or use of equivalent functional actions for actions described herein. Any insubstantial variations are to be considered within the scope of the claims below.

Preparation of the Resin Extended Polymer:

100 g of clear, non-oil extended Styrene Butadiene Rubber are dissolved in 2 L of dried Toluene. To this solution 37 g of resin with a Tg between −20 and +100° C. and a Mn between 400 and 950 Da are added. The completed solution is stirred for 1 h, the solvent is removed by evaporation and the remaining mass is then dried at an elevated temperature of 50° C. in a vacuum of 1 Torr until constant weight. The resultant polymer resin mixture is used in subsequent compound formulations. Table 1 provides the details of the polymer and resins and their combination. Other methodologies for preparation of the resin extend polymer may involve for example contacting a solution of a resin and a suitable solvent with a boiling point less than 100° C. with a solution comprising a styrene butadiene rubber and an organic solvent (e.g., cyclohexane) to form a mixture. The mixture may subsequently be poured into hot water which strips the organic solvent allowing the polymer-resin components to coagulate. The coagulated polymer-resin components may then be separated from the water and dried.

TABLE 1

Polymers, Resins and Their Combinations.

| Example | Mixture 1 | Mixture 2 | Mixture 3 | Mixture 4 |
|---|---|---|---|---|
| Polymer | SPRINTAN ™ 4601 | SPRINTAN ™ 4601 | SPRINTAN ™ 3401 | SPRINTAN ™3401 |
| Polymer Weight in phr | 100 | 100 | 100 | 100 |
| Resin | SYLVATRAXX ™ 4150 | SYLVATRAXX ™ 4401 | SYLVATAC ™ RE12 | SYLVATRAXX ™ 4202 |
| Resin Weight in phr | 37.5 | 37.5 | 37.5 | 37.5 |

Table 2 provides the rubber compound formulations including the comparative examples.

TABLE 2

Rubber Compound Formulations.

| Components in phr | A | Comp. A | B | Comp. B | C | Comp. C | D | Comp. D |
|---|---|---|---|---|---|---|---|---|
| Polymer Resin Mixture 1 | 137.5 | | | | | | | |
| Rubber SPRINTAN ™4601 | | 100 | | | | | | |
| Resin SYLVATARXX ™4150 | | 37.5 | | | | | | |
| Polymer Resin Mixture 2 | | | 137.5 | | | | | |
| Rubber SPRINTAN ™4601 | | | | 100 | | | | |
| Resin SYLVATRAXX ™4401 | | | | 37.5 | | | | |
| Polymer Resin Mixture 3 | | | | | 137.5 | | | |
| Rubber SPRINTAN ™3401 | | | | | | 100 | | |
| Resin SYLVLITE ™RE12 | | | | | | 37.5 | | |
| Polymer Resin Mixture 4 | | | | | | | 137.5 | |
| Rubber SPRINTAN ™3401 | | | | | | | | 100 |

TABLE 2-continued

Rubber Compound Formulations.

| Components in phr | A | Comp. A | B | Comp. B | C | Comp. C | D | Comp. D |
|---|---|---|---|---|---|---|---|---|
| Resin SYLVATRAXX ™4202 | | | | | | | | 37.5 |
| Silica ULTRASIL ™ 7000 GR | 80 | 80 | 80 | 80 | 80 | 80 | 80 | 80 |
| Silane Si69 ™ | 8 | 8 | 8 | 8 | 8 | 8 | 8 | 8 |
| Carbon Black ISAF -N234 | 10 | 10 | 10 | 10 | 10 | 10 | 10 | 10 |
| Zinc oxide RS ™ | 3 | 3 | 3 | 3 | 3 | 3 | 3 | 3 |
| Stearic acid | 1 | 1 | 1 | 1 | 1 | 1 | 1 | 1 |
| iPPD/antidegradant VULKANOX ™ 4010 | 1 | 1 | 1 | 1 | 1 | 1 | 1 | 1 |
| 6PPD/antidegradant VULKANOX ™ 4020 | 2 | 2 | 2 | 2 | 2 | 2 | 2 | 2 |
| TMQ/antioxidant VULKANOX ™ HS | 0.5 | 0.5 | 0.5 | 0.5 | 0.5 | 0.5 | 0.5 | 0.5 |
| Wax ANTILUX ™ 654 | 1 | 1 | 1 | 1 | 1 | 1 | 1 | 1 |
| CBS | 1.5 | 1.5 | 1.5 | 1.5 | 1.5 | 1.5 | 1.5 | 1.5 |
| SDPG | 2 | 2 | 2 | 2 | 2 | 2 | 2 | 2 |
| Sulphur | 2 | 2 | 2 | 2 | 2 | 2 | 2 | 2 |

SPRINTAN™ is a trademark of Trinseo; SYLVATRAXX™ and SYLVATAC™ are trademarks of Kraton Corp.; ULTRASIL™ and Si-69™ are trademarks of Evonik; Zink oxide RS™ is a trademark of Brueggemann Chemical, VULKANOX™ is a trademark of Lanxess AG, and ANTILUX™ is a trademark of Rheinchemie AG.

PCR tread compounds are mixed according to the formulations provided in table 2 following the mix protocol provided in Tables 3a and 3b.

TABLE 3a

Mix Protocol for Mixtures A to D.

| | 1. non-productive stage NP1 | Parts (phr) | Time (minutes) | Rotor speed (rpm) | Temperature (° C.) |
|---|---|---|---|---|---|
| 1 | add Mixture A or B or C or D | 100.0 | 0.5 | 60 | 75 |
| 2 | masticate | | 1 | 60 | |
| 3 | add Silica components: Stearic acid | 30.0 2.5 | 0.5 | 60 | |
| 4 | masticate | | 1 | 60 | |
| 5 | add Silica components: Silane | 30.0 6.4 | 0.5 | 60 | |
| 6 | masticate | | 1 | 60 | |
| 7 | add Silica components: Carbon Black iPPD 6PPD TMQ Wax | 20.0 15.0 3.1 1.0 1.2 1.0 | 0.5 | 60 | |
| 8 | masticate | | 0.5 | 60 | |
| 9 | ram raise | | 0.1 | 60 | |
| 10 | go to temperature | | | 100 | 150 |
| 11 | Dump | | | | |
| | total | 229.2 | | | |

| | 2. non-productive stage NP2 | Parts (phr) | Time (minutes) | Rotor speed (rpm) | Temperature (° C.) |
|---|---|---|---|---|---|
| 1 | add NP1 | 229.2 | 0.5 | 90 | 75 |
| 2 | go to temp | | | 120 | 145 |
| 3 | Mix: Silanize | | 4 | start at 80 rpm adjusted to stable temperature | |
| 4 | Dump | | | | |
| | total | 229.2 | | | |

TABLE 3a-continued

Mix Protocol for Mixtures A to D.

| 3. productive stage FINAL | | Parts (phr) | Time (minutes) | Rotor speed (rpm) | Temperature (° C.) |
|---|---|---|---|---|---|
| 1 | add NP2 | | 0.5 | 55 | 75 |
| 2 | masticate | | 0.3 | 55 | |
| 3 | add curatives CBS | 1.5 | 0.3 | 55 | |
| | SDPG | 2.0 | | | |
| | Sulfur | 2.0 | | | |
| 4 | go to temp | | | 55 | 100 |
| 5 | Dump | | | | |
| | total | 240.2 | | | |

TABLE 3b

Non-productive Stage NP1 for comparative examples.

| | 1. non productive stage NP1 | | Parts (phr) | Time (minutes) | Rotor speed (rpm) | Temperature (° C.) |
|---|---|---|---|---|---|---|
| 1 | add rubber | | 100.0 | 0.5 | 60 | 75 |
| 2 | masticate | | | 1 | 60 | |
| 3 | add components: | Silica | 30.0 | | | |
| | | Stearic acid | 2.5 | 0.5 | 60 | |
| | | Resin | 15.0 | | | |
| 4 | masticate | | | 1 | 60 | |
| 5 | add components: | Silica | 30.0 | | | |
| | | Resin | 15.0 | 0.5 | 60 | |
| | | Silane | 6.4 | | | |
| 6 | masticate | | | 1 | 60 | |
| 7 | add components: | Silica | 20.0 | | | |
| | | Resin | 7.5 | | | |
| | | Carbon Black | 15.0 | | | |
| | | iPPD | 3.1 | 0.5 | 60 | |
| | | 6PPD | 1.0 | | | |
| | | TMQ | 1.2 | | | |
| | | Wax | 1.0 | | | |
| 8 | masticate | | | 0.5 | 60 | |
| 9 | ram raise | | | 0.1 | 60 | |
| 10 | go to temperature | | | | 100 | 150 |
| 11 | Dump | | | | | |
| | total | | 229.2 | | | |

The nonproductive stage NP2 and the productive stage FINAL are the same as described in table 3a.c Vulcanization is carried out in a hot press at 160° C. for a time calculated from the equation:

Cure time=$T_{90}$(as measured by MDR according to ISO 6502-1999)+2 additional minutes for each 1 mm of compound thickness

ADDITIONAL DISCLOSURE

The following enumerated aspects of the present disclosures are provided as non-limiting examples.

A first aspect which is process for the preparation of a shaped rubber composition comprising combining a rubber compound with an extender compound to produce a mixture; drying the mixture to produce a dried mixture; and shaping the mixture wherein the extender compound comprises a natural or hydrocarbon resin, which possesses a glass transition temperature of at equal to or greater than about −70° C. and an acid value of 50 mg KOH/g or less and wherein the mixture is shaped into particles or bales.

A second aspect which is the rubber composition of the first aspect wherein the natural or hydrocarbon resin is an aliphatic hydrocarbon resin, an aromatic resin, a cyclo-aliphatic resin, a terpene resin, oligo-ester, rosin and/or rosin ester.

A third aspect which is the rubber composition of the second aspect wherein the natural or hydrocarbon resin is an alpha-methyl styrene resin, a terpene resin, oligo-ester, rosin and/or rosin ester.

A fourth aspect which is the rubber composition according to any one of the preceding aspects wherein the resin is of natural origin.

A fifth aspect which is the rubber composition according to any one of the preceding aspects wherein the rubber composition is in particulate form.

A sixth aspect which is the rubber composition according to the fifth aspect wherein particulate form comprises comminuted into small particles, shaped into granules or flakes, or shaped into blocks.

A seventh aspect which is the rubber composition according to any one of the preceding aspects wherein the natural or hydrocarbon has a molecular weight ranging from 400 to 2000 Dalton (Mw) and a transition glass temperature (Tg) of between −10 and 100° C.

An eighth aspect which is the rubber composition according to any one of the preceding aspects wherein the natural or hydrocarbon is present in amount ranging from 1-75 phr, preferably 25-75, more preferably 50-75 phr.

A ninth aspect which is the rubber composition according to any one of the preceding aspects wherein the natural or hydrocarbon resin is present in an amount above 20 phr, preferably between 30 and 50 phr.

A tenth aspect which is the rubber composition according to any one of the preceding aspects wherein no additional extender compounds are present beside the natural or hydrocarbon resin, which possesses a glass transition temperature of at least −10° C. and an acid value of 50 mg KOH/g or less.

An eleventh aspect which is the rubber composition according to any one of the preceding aspects wherein the natural or hydrocarbon resin comprises an aliphatic hydrocarbon resin.

A twelfth aspect which is the rubber composition according to any one of the preceding aspects wherein the natural or hydrocarbon resin comprises an aromatic resin, preferably an alpha-methyl styrene resin.

A thirteenth aspect which is the rubber composition according to any one of the preceding aspects wherein the natural or hydrocarbon resin comprises terpene such as bicyclic terpene and monocyclic terpene, such as δ-2-carene, δ-3-carene, dipentene, limonene, myrcene, β-phellandrene, α-pinene, β-pinene, α-terpinene, γ-terpinene, and terpinolene.

A fourteenth aspect which is the rubber composition according to any one of the preceding aspects wherein the natural or hydrocarbon resin is an oligoterpene resin, a terpene hydrocarbon resin, a terpene phenolic resin or styrenated terpene or mixtures thereof.

A fifteenth aspect which is the rubber composition according to any one of the preceding aspects wherein the natural or hydrocarbon resin is a rosin ester.

A sixteenth aspect which is the rubber composition according the fifteenth aspect wherein the rosin ester is an ester of rosin and a polyhydric phenol.

A seventeenth aspect which is the rubber composition according to any one of the preceding aspects wherein the rubber compound comprises a styrene butadiene copolymer.

An eighteenth aspect which is a process for the preparation of a shaped rubber composition comprising a diene rubber wherein a rubber compound is combined with an extender compound, dried and shaped into particles and wherein the extender compound comprises a natural or hydrocarbon resin, which possesses a glass transition temperature of at least −10° C. and an acid value of 50 mg KOH/g or less.

A nineteenth aspect which is a shaped rubber composition obtainable by the process according to the eighteenth aspect.

A twentieth aspect which is the rubber composition according to any one of the preceding aspects wherein the rubber composition is compounded with additives to form a tire rubber composition.

A twenty-first aspect which is the rubber composition according to twentieth aspect wherein the additives comprise curing aids, processing additives, fillers, pigments, and reinforcing materials.

A twenty-second aspect which is a tire rubber composition comprising the rubber composition according to twentieth or twenty-first aspects.

A twenty-third aspect which is a process for the preparation of a tire rubber composition wherein a rubber composition according to any of one the preceding aspects is compounded with additives such as curing aids, processing additives, fillers, pigments, antioxidants, coupling agents, viscosifiers, softeners and reinforcing material.

A twenty-fourth aspect which is a process for the preparation of a tire rubber composition wherein a rubber composition according to any one of the preceding aspect that has a resin concentration of more than 20 phr is used as a masterbatch for compounding with other additives to form a tire rubber composition.

A twenty-fifth aspect which is a tire rubber composition obtainable by the process according to the twenty-third or twenty-fourth aspects.

A twenty-sixth aspect which is a rubber composition according to any one of the preceding aspects wherein the rubber composition comprises TEA (tread enhancing additives) and other additives to form a tire tread composition.

A twenty-seventh aspect which is a tire tread composition comprising the rubber composition according to the twenty-sixth aspect.

A twenty-eighth aspect which is the tire tread composition of the twenty-seventh aspect wherein the rubber composition comprises more than 20 phr TEA, preferably between 30 phr and 50 phr.

A twenty-ninth aspect which is a process for preparing a tire tread composition wherein a rubber composition according to any one of the preceding claims is compounded with TEA and other additives to form a tire tread composition.

A thirtieth aspect which is a tire tread composition obtainable by the process according to the twenty-ninth aspect.

A thirty-first aspect which is a process for the production of a tire wherein a) a tire is built from a tire tread composition according to any one of the twenty-fifth through thirtieth aspects and other tire components, b) the built tire is shaped and cured to form a tire.

A thirty-second aspect which is a tire built up using a tire tread composition according to any one of the twenty-fifth through thirtieth aspects.

A thirty-third aspect which is a rubber composition comprising a rubber and an extender compound, wherein the extender compound comprises a natural or hydrocarbon resin, which possesses a glass transition temperature (Tg) of 0° C. or less and a molecular weight of at least 300 Dalton (Mw).

A thirty-fourth aspect which is the rubber composition of the thirty-third aspect wherein the natural or hydrocarbon resin is an aliphatic hydrocarbon resin, an aromatic resin, a cyclo-aliphatic resin, a terpene resin, oligoester, rosin and/or rosin ester.

A thirty-fifth aspect which is the rubber composition of the thirty-fourth aspect wherein the natural or hydrocarbon resin is an alpha-methyl styrene resin, a terpene resin, oligoester, rosin and/or rosin ester.

A thirty-sixth aspect which is the rubber composition of any of the thirty-fourth through thirty-fifth aspects wherein the resin is of natural origin.

A thirty-seventh aspect which is the rubber composition of any of the thirty-fourth through thirty-sixth aspects wherein the rubber composition is in particulate form.

A thirty-eighth aspect which is the rubber composition of the thirty-seventh aspect wherein the particulate form comprises comminuted into small particles, shaped into granules or flakes, or shaped into blocks.

A thirty-ninth aspect which is the rubber composition of any of the thirty-fourth through thirty-eight aspects wherein the natural or hydrocarbon has a molecular weight ranging from 300 to 2000 Dalton (Mw) and a transition glass temperature (Tg) of between −60 and 0° C.

A fortieth aspect which is the rubber composition of any of the thirty-fourth through thirty-ninth aspects wherein the natural or hydrocarbon is present in amount ranging from 1-75 phr, preferably 2-75, more preferably 5-75 phr.

A forty-first aspect which is the rubber composition of any of the thirty-fourth through fortieth aspects wherein the natural or hydrocarbon resin is present in an amount above 2 phr, preferably between 5 and 50 phr.

A forty-second aspect which is the rubber composition of any of the thirty-fourth through forty-first aspects wherein no additional extender compounds are present beside the natural or hydrocarbon resin, which possesses a molecular weight ranging from 300 to 2000 Dalton (Mw) and a transition glass temperature (Tg) of between −60 and 0° C.

A forty-third aspect which is the rubber composition of any of the thirty-fourth through forty-second aspects wherein the natural or hydrocarbon resin comprises an aliphatic hydrocarbon resin.

A forty-fourth aspect which is the rubber composition of any of the thirty-fourth through forty-third aspects wherein the natural or hydrocarbon resin comprises an aromatic resin, preferably an alpha-methyl styrene resin.

A forty-fifth aspect which is the rubber composition of any of the thirty-fourth through forty-fourth aspects wherein the natural or hydrocarbon resin comprises terpene such as bicyclic terpene and monocyclic terpene, such as δ-2-carene, δ-3-carene, dipentene, limonene, myrcene, β-phellandrene, α-pinene, β-pinene, α-terpinene, γ-terpinene, and terpinolene.

A forty-sixth aspect which is the rubber composition of any of the thirty-fourth through forty-fifth aspects wherein the natural or hydrocarbon resin is an oligoterpene resin, a terpene hydrocarbon resin, a terpene phenolic resin or styrenated terpene or mixtures thereof.

A forty-seventh aspect which is the rubber composition of any of the thirty-fourth through forty-sixth aspects wherein the natural or hydrocarbon resin is a rosin ester.

A forty-eighth aspect which is the rubber composition of the forty-seventh aspect wherein the rosin ester is an ester of rosin and a polyhydric phenol.

A forty-ninth aspect which is the rubber composition of any of the thirty-fourth through forty-eighth aspects wherein the oligoester is an ester of rosin and a polycarboxylic fatty acid.

A fiftieth aspect which is the rubber composition of any of the thirty-fourth through forty-ninth aspects wherein the rubber compound comprises a styrene butadiene copolymer.

A fifty-first aspect which is a process for the preparation of a shaped rubber composition comprising a diene rubber wherein a rubber compound is combined with an extender compound, dried and shaped into particles and wherein the extender compound comprises a natural or hydrocarbon resin, which possesses a molecular weight ranging from 300 to 2000 Dalton (Mw) and a transition glass temperature (Tg) of between −60 and 0° C.

A fifty-second aspect which is a shaped rubber composition obtainable by the process according to the fifty-first aspect.

A fifty-third aspect which is the rubber composition of any of the fifty-first through fifty-second aspects wherein the rubber composition is compounded with additives to form a tire rubber composition.

A fifty-fourth aspect which is the rubber composition of the fifty-third aspect wherein the additives comprise curing aids, processing additives, fillers, pigments, and reinforcing materials.

A fifty-fifth aspect which is a tire rubber composition comprising the rubber composition according to any of the fifty-third through fifty-fourth aspects.

A fifty-sixth aspect which is a process for the preparation of a tire rubber composition wherein a rubber composition according to any of one the thirty-fourth through fifty-fifth aspects is compounded with additives such as curing aids, processing additives, fillers, pigments, antioxidants, coupling agents, viscosifiers, softeners and reinforcing material.

A fifty-seventh aspect which is a process for the preparation of a tire rubber composition wherein a rubber composition according to any of one the thirty-fourth through fifty-sixth aspects that has a resin concentration of more than 20 phr is used as a masterbatch for compounding with other additives to form a tire rubber composition.

A fifty-eighth aspect which is a tire rubber composition obtainable by the process according to any of the fifty-sixth through fifty-seventh aspects.

A fifty ninth aspect which is a rubber composition according to any one of the thirty-fourth through fifty-eighth aspects wherein the rubber composition comprises TEA (tread enhancing additives) and other additives to form a tire tread composition.

A sixtieth aspect which is a tire tread composition comprising the rubber composition according to the fifty-ninth aspect.

A sixty-first aspect which is a tire tread composition according to the sixtieth aspect wherein the composition comprises more than 20 phr TEA, preferably between 30 phr and 50 phr.

A sixty-second aspect which is a process for preparing a tire tread composition wherein a rubber composition according to any one of the thirty-fourth through sixty-first aspects is compounded with TEA and other additives to form a tire tread composition.

A sixty-third aspect which is a tire tread composition obtainable by the process according to the sixty-second aspect.

A sixty-fourth aspect which is a process for the production of a tire wherein: a) a tire is built from a tire tread composition according to any one of the fifty-seventh through sixty-third aspects and other tire components, b) the built tire is shaped and cured to form a tire.

A sixty-fifth aspect which is a tire built up using a tire tread composition according to any one of the fifty-seventh through sixty-third aspects.

The compositions and methods of the appended claims are not limited in scope by the specific compositions and methods described herein, which are intended as illustrations of a few aspects of the claims. Any compositions and methods that are functionally equivalent are intended to fall within the scope of the claims. Various modifications of the compositions and methods in addition to those shown and described herein are intended to fall within the scope of the appended claims. Further, while only certain representative compositions and method steps disclosed herein are specifically described, other combinations of the compositions and method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated.

The term "comprising" and variations thereof as used herein is used synonymously with the term "including" and variations thereof and are open, non-limiting terms. Although the terms "comprising" and "including" have been used herein to describe various aspects, the terms "consisting essentially of" and "consisting of" can be used in place of "comprising" and "including" to provide for more specific aspects of the disclosure and are also disclosed. Other than where noted, all numbers expressing geometries, dimensions, and so forth used in the specification and claims are to be understood at the very least, and not as an attempt to limit the application of the doctrine of equivalents to the scope of the claims, to be construed in light of the number of significant digits and ordinary rounding approaches.

Unless defined otherwise, all technical and scientific terms used herein have the same meanings as commonly understood by one of skill in the art to which the disclosed disclosure belongs. Publications cited herein and the materials for which they are cited are specifically incorporated by reference.

Other than where noted, all numbers expressing geometries, dimensions, and so forth used in the specification and claims are to be understood at the very least, and not as an attempt to limit the application of the doctrine of equivalents to the scope of the claims, to be construed in light of the number of significant digits and ordinary rounding approaches. Further, any range of numbers recited in the specification or claims, such as that representing a particular set of properties, units of measure, conditions, physical states or percentages, is intended to literally incorporate expressly herein by reference or otherwise, any number falling within such range, including any subset of numbers within any range so recited. For example, whenever a numerical range with a lower limit, RL, and an upper limit RU, is disclosed, any number R falling within the range is specifically disclosed. In particular, the following numbers R within the range are specifically disclosed: R=RL+k(RU−RL), where k is a variable ranging from 1% to 100% with a 1% increment, e.g., k is 1%, 2%, 3%, 4%, 5% . . . . 50%, 51%, 52% . . . . 95%, 96%, 97%, 98%, 99%, or 100%. Moreover, any numerical range represented by any two values of R, as calculated above is also specifically disclosed.

The invention claimed is:

1. A process for the preparation of a shaped rubber composition comprising:
    combining a rubber compound with an extender compound in an organic solvent to produce a solution;
    drying the solution to produce a dried mixture; and
    shaping the mixture;
        wherein the extender compound comprises a natural or hydrocarbon resin having a glass transition temperature of 70° C. to about 120° C., and an acid value of 50 mg KOH/g or less,
        and wherein the mixture is shaped into particles or bales.

2. The process according to claim 1 wherein the natural or hydrocarbon resin is an aliphatic hydrocarbon resin, an aromatic resin, a cyclo-aliphatic resin, a terpene resin, oligoester, rosin and/or rosin ester.

3. The process according to claim 1 wherein the natural or hydrocarbon resin is an alpha-methyl styrene resin, a terpene resin, oligoester, a rosin, a rosin ester or combinations thereof.

4. The process according to claim 1 wherein the resin is of natural origin.

5. The process according to claim 1 wherein the rubber composition is in particulate form.

6. The process according to claim 5 wherein the particulate form comprises comminuted small particles, shaped granules or flakes, or shaped blocks.

7. The process according to claim 1 wherein the natural or hydrocarbon resin has a molecular weight ranging from 400 to 2000 Dalton ($M_w$) and a transition glass temperature (Tg) of between −10 and 100° C.

8. The process according to claim 1 wherein the natural or hydrocarbon resin is present in an amount ranging from 1-75 phr.

9. The process according to claim 1 excluding additional extender compounds.

10. The process according to claim 1 wherein the natural or hydrocarbon resin comprises an aliphatic hydrocarbon resin.

11. The process according to claim 1 wherein the natural or hydrocarbon resin comprises an aromatic resin.

12. The process according to claim 1 wherein the natural or hydrocarbon resin comprises terpene, bicyclic terpene, monocyclic terpene, δ-2-carene, δ-3-carene, dipentene, limonene, myrcene, β-phellandrene, α-pinene, β-pinene, α-terpinene, γ-terpinene, or terpinolene.

13. The process according to claim 1 wherein the natural or hydrocarbon resin is an oligoterpene resin, a terpene hydrocarbon resin, a terpene phenolic resin, styrenated terpene or mixtures thereof.

14. The process according to claim 1 wherein the natural or hydrocarbon resin is a rosin ester.

15. The process according to claim 14 wherein the rosin ester is an ester of rosin and a polyhydric phenol.

16. The process according to claim 1 wherein the rubber compound comprises a styrene butadiene copolymer.

17. A tire rubber composition prepared by compounding the rubber composition of claim 1 with additives comprising curing aids, processing additives, fillers, pigments, reinforcing materials, or combinations thereof.

18. A shaped rubber composition obtainable by the process according to claim 1.

* * * * *